Aug. 1, 1967 E. B. VINCENT 3,334,175

SHIELDED ENCLOSURE

Filed Oct. 28, 1964 3 Sheets-Sheet 1

INVENTOR.
Edwin B. Vincent

BY Jerome Bauer

ATTORNEY

Aug. 1, 1967 E. B. VINCENT 3,334,175

SHIELDED ENCLOSURE

Filed Oct. 28, 1964 3 Sheets-Sheet 2

INVENTOR.
Edwin B. Vincent,

BY Jerome Bauer

ATTORNEY

INVENTOR.
Edwin B. Vincent
BY Jerome Bauer
ATTORNEY

United States Patent Office 3,334,175
Patented Aug. 1, 1967

3,334,175
SHIELDED ENCLOSURE

Edwin B. Vincent, N. Hempstead Turnpike, East Norwich, N.Y. 11732

Filed Oct. 28, 1964, Ser. No. 407,161
4 Claims. (Cl. 174—35)

This invention relates to shielded enclosures and, more particularly, to shielded enclosures for providing shielding against radio frequency interference (R.F.I.) energy.

The desideratum of the invention is to provide a shielded enclosure that retains therewithin all radio frequency interference emanating from the interior of the enclosure and keeps out of and shields the interior from all radio frequency interference or energy whose source is outside the enclosure.

In accomplishing the purposes of the invention, an object is to provide shielded enclosures that can be made of any desired size and shape simply by joining together preformed corner brackets and runners which are easily connected each to the other to form a continuous frame that insures proper electrical conductivity for the life of the enclosure and, further, to maintain such proper conductivity by way of covering walls that are constantly in engagement with radio frequency energy suppressing gaskets that form a barrier between the walls and the frames. A novel feature of the invention resides in the arrangement of the details of construction that enable the enclosure to prevent the passage of stray radio frequency energy between the interior and the exterior of the enclosure.

Further objects of the invention are to provide novel preformed structural elements that permit quick construction of the enclosure to suit the desires of engineers whose requirements do not conform to standard sizes and shapes without sacrificing the effectiveness of such shield.

Figures 1, 2:
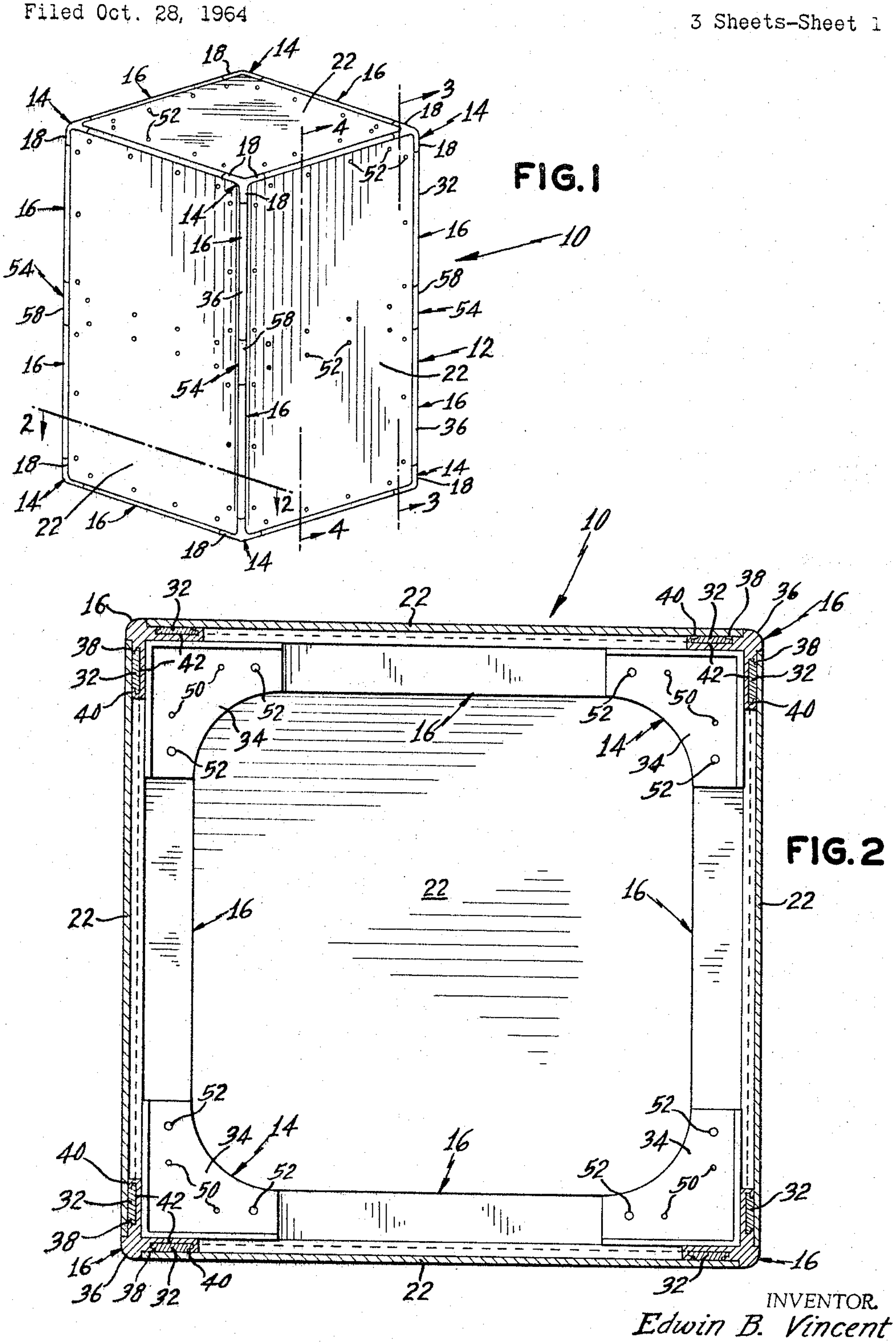
Figure 3:
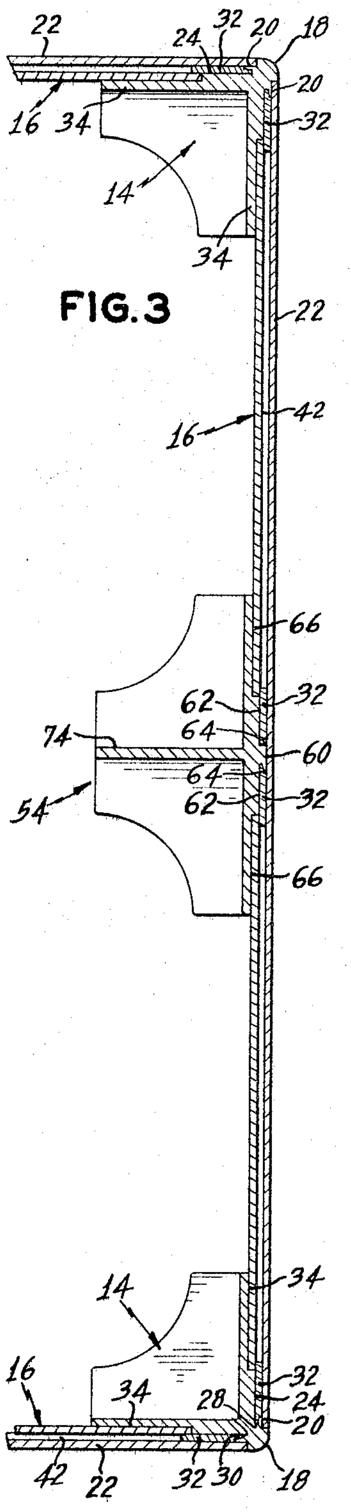
Figure 4:
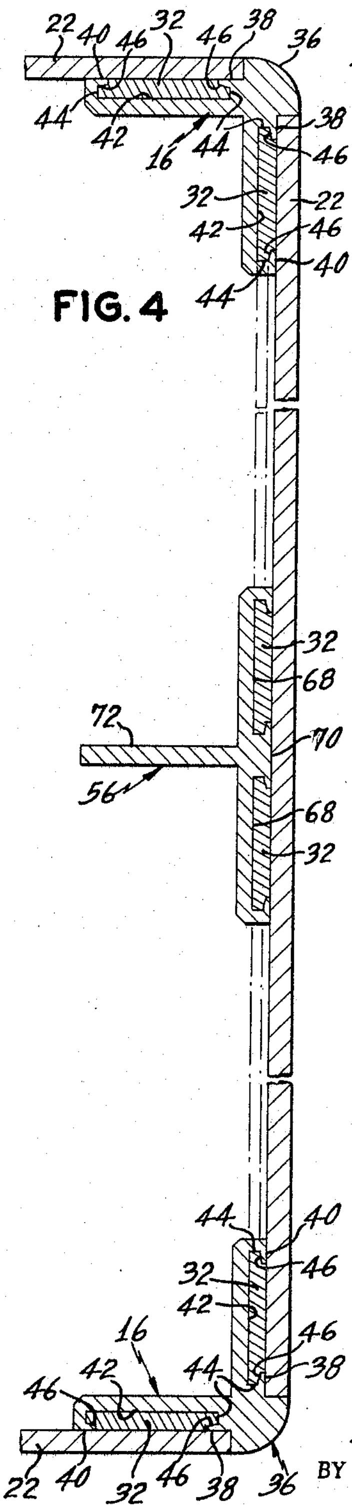
Figure 5:
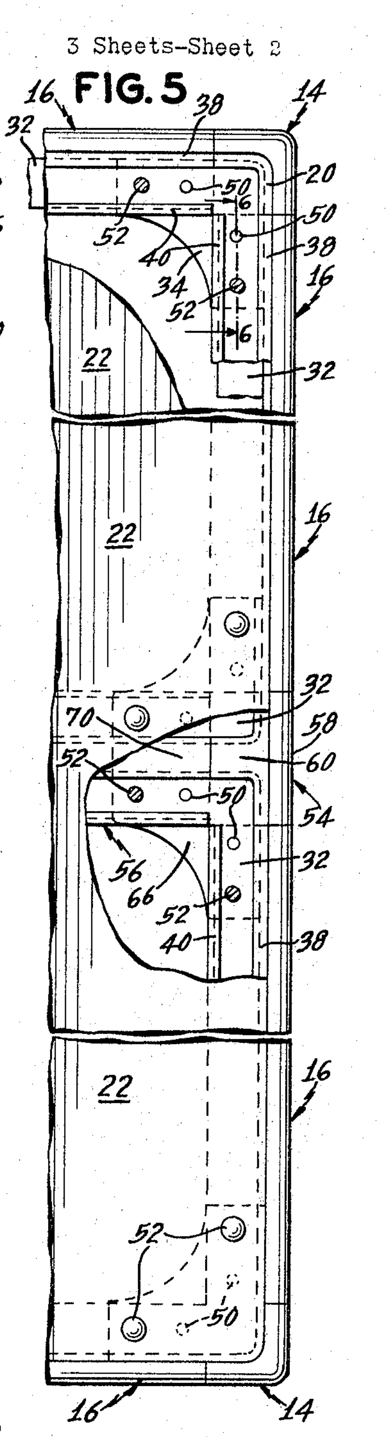
Figure 7:
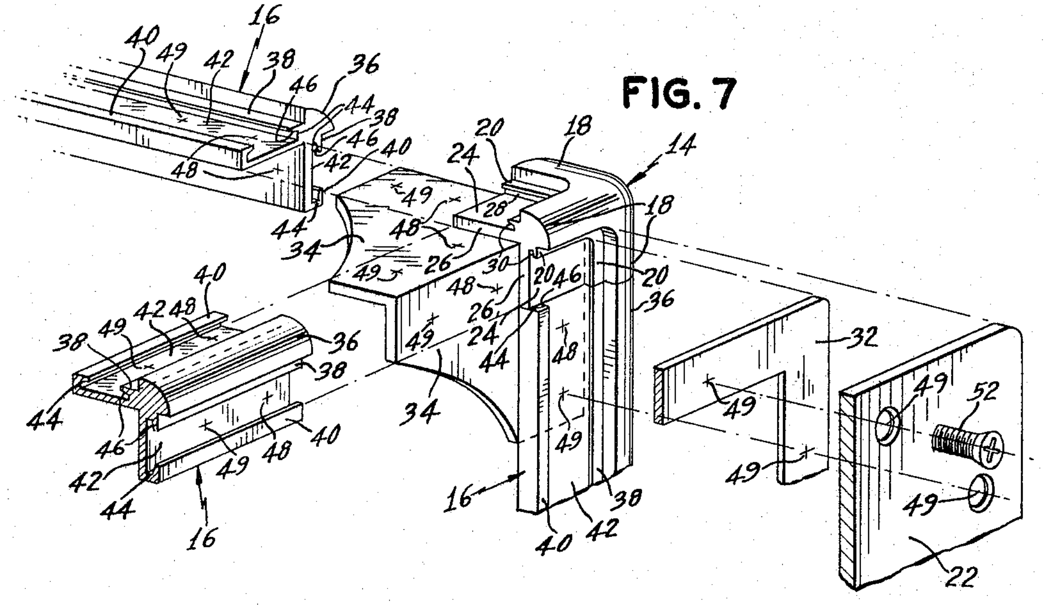
Figures 6, 8:
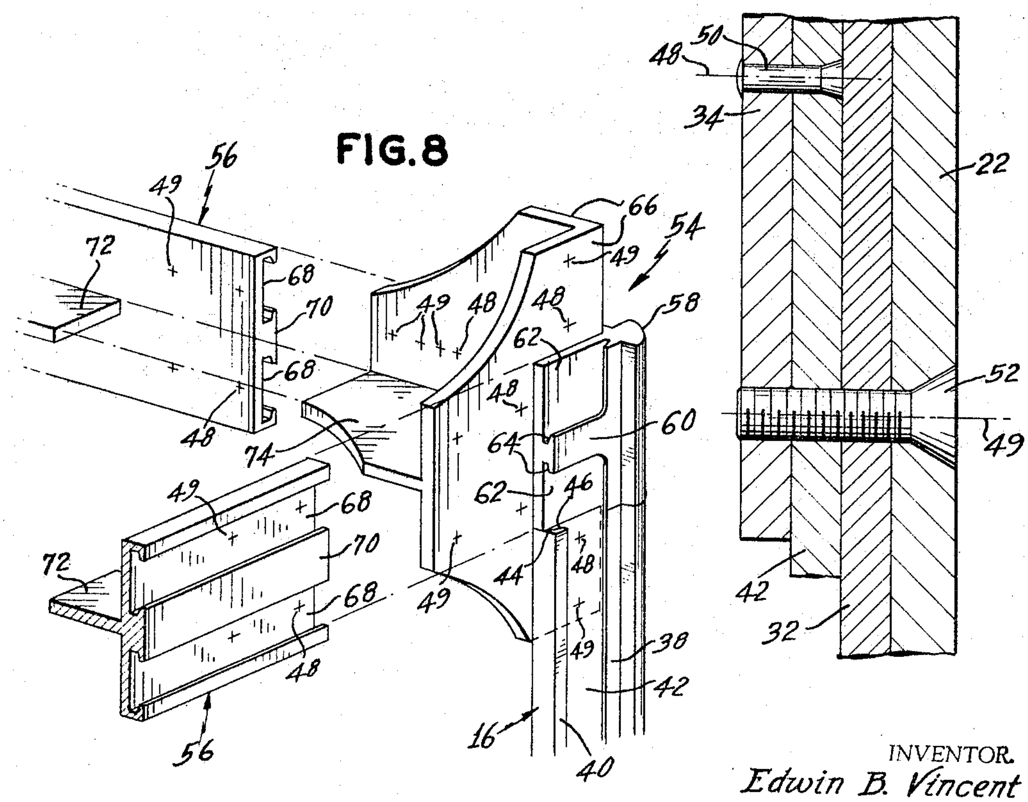

Other and further objects of this invention reside in the structures and arrangements hereinafter more fully described with reference to the accompanying drawings in which:

FIG. 1 is a perspective view of a shielded enclosure constructed according to the invention, FIG. 2 is an enlarged cross section of a plane of FIG. 1 taken along lines 2—2 thereof, FIG. 3 is an enlarged cross section of FIG. 1 taken along lines 3—3, FIG. 4 is an enlarged cross section of FIG. 1 taken along lines 4—4, FIG. 5 is an enlarged view of an edge of the enclosure of FIG. 1 with portions removed therefrom, FIG. 6 is a cross section of FIG. 5 taken along lines 6—6, FIG. 7 is an exploded view of a corner portion of the shielded enclosure, and FIG. 8 is an exploded view of an intermediate portion of the shielded enclosure.

Referring to FIG. 1 of the drawings, the shielded enclosure thereshown is generally identified by the numeral 10. For convenience of explanation of the invention, FIG. 1 illustrates a simple rectangularly shaped six sided figure, having eight corners. The shielded enclosure 10 comprises a simple unitarily constructed framework that is generally identified by the numeral 12.

The framework 12 is defined by and, therefore, includes eight corner brackets each generally identified by the numeral 14. The corner bracketn 14 are connected together with each other by runners generally identified by the numeral 16. Each of the corner brackets 14 has three corner sides of identical configuration each of which is angularly related to the other to extend in the plane of each of the adjacent sides of the enclosure 10.

Referring to FIG. 7, the corner bracket 14 thereshown in fuller detail may be formed as a casting of electrically conductive material. The corner bracket 14 has a peripheral bead 18 that extends in three directions and is intended to define the peripheral corner edge of three adjacent sides of the enclosure 10. Spaced inward from and completely along the corner peripheral edge or bead 18 of each side of the enclosure 10 is a recessed laterally directed surface 20 that defines a seat upon which a covering plate or wall panel 22 is adapted to seat and engage. The seat 20 is positioned between the bead 18 and a gasket seat 24.

The gasket seat 24 is spaced interior of or inward from the bead 18 and extends laterally along a laterally directed portion 26 of the bracket 14. The brackets 14 define an integral corner part of the frame that borders each side of the shielded enclosure 10. The gasket seat 24 is partially channel shaped in that the outer bordering portion of the same is provided with an undercut 28 that extends laterally outwardly and beneath the recessed surface 20 on which the cover plate 22 is adapted to rest. The undercut 28 includes an angularly directed sloping or tapered surface 30 that serves as a retaining means adapted to engage with a gasket 32 subsequently to be seated in the gasket seat 24.

Each corner of the corner brackets 14 has a support ledge 34 that extends laterally in the plane of a respective one of the sides of the enclosure 10. The three laterally extending ledges 34 are unitarily formed with each other and as a recessed extension of the frame portion 26. However, the ledges 34 are recessed inward from or interior of the side portions 26 in which the gasket seats 24 are formed and, therefore, extend in a different plane therefrom. The ledges 34 each provide a surface support for the runners 16 that form an integral part of the overall framework 12 and, therefore, define a part of the frame bordering each side of the shielded enclosure 10.

The runners 16 that connect the corner brackets 14 together are of identical structural details. The runners 16 may be extruded or formed in any other convenient manner of electrically conductive material. Each runner 16 has a bead 36 that is adapted to mate and align with the bead 18 of the corner bracket 14. The bead 36 extends along and defines the peripheral edge of two adjacent sides of the enclosure 10. Like the corner bracket 14, each peripheral runner 16 is provided with a laterally directed surface 38 recessed inward or interiorly of the bead 36 and that defines a seat for the reception of the cover plate 22. The recessed seat or surface 38 is adapted to be aligned with the similar surface 20 of the corner bracket 14.

Each runner 16 also is provided with a laterally directed and spaced surface 40 that is located in the same plane as the surface 38 to function as a further support and for conductive engagement with the cover plate 22. The planar related surfaces 38 and 40 are defined in a laterally directed portion of the frame that borders each side of the enclosure 10. Recessed inward or interior of the surfaces 38 and 40 is a channel or substantially T-shaped seat 42 that is adapted to be aligned with the gasket seat 24. Like the corner bracket 14, each runner 16 has a pair of laterally spaced undercuts 44, each of which includes an angularly directed sloping surface 46 that serves as a retainer means to retain the gasket 32 on and in constant engagement with the gasket seating surface 42 and in the undercuts 44.

Thus, it can be seen that the details of the corner brackets 14 coincide substantially with the details of the connecting runners 16. The runners 16 are adapted to be placed into proper alignment with the corner brackets and to be so secured to the same being supported on the planar surfaces of the projecting ledges 34 of the corner brackets. The runners 16 and the brackets 14 are adapted to be rigidly secured together at convenient points such as those identified by the numerals 48 by any convenient securing means such as the rivets 50 illustrated in FIG. 6. When the runners are mounted on the ledges 34 and connected therewith by securing means 50, they are then retained as a unitary extension thereof and in such intimate contact as to conduct electrical current and energy therebetween.

Each of the runners 16 has two identical laterally extending side portions directed at angles disposed relative to each other to define a portion of the frame that borders two adjacent sides of the enclosure 10. The bead 36 forms the juncture at which the two angularly disposed bordering frame portions are unitarily formed together. This bead serves as a stiffener and also as a baffle that prevents the passage of stray radio frequency energy from between the interior and exterior of the enclosure about the cover plate 22 to be described.

After all the corner brackets 14 and connecting runners 16 are connected with each other to define and complete the framework 12 for the shielded enclosure 10, each side of the enclosure then may be said to have a separate bordering frame. The bordering frame of each side of the enclosure, and its laterally extending portion thereof, includes the endless cover seats and the endless gasket seats that border each side of the enclosure. A gasket is now adapted to be received in the endless gasket seat. The gasket 32 may be formed of any suitable electrically conductive material so as to provide a complete proper conductive path therealong. In practice, such gaskets are made of woven electrically conductive wire. The gasket 32 is of endless shape, that is to say, it is unbroken throughout its length and is adapted to fit into the endless gasket seat ringing the border frame of each side of the enclosure 10.

The endless gasket 32 is slightly larger in width and thickness than the channel shaped gasket seat defined in the runners and corner brackets. Therefore, when the gasket 32 is inserted as a whole into the gasket seat of the frame of each side, it engages with the retainer surfaces 30 and 46. This cooperative engagement tends to move and forcefully retain the gasket in tight planar engagement with the planar seating surfaces 24 and 42 of the corner brackets and runners respectively. When so seated and held, the gaskets 32 completely ring their respective endless retainer seats provided in the frame of each side and thereby completely borders each respective side of the enclosure 10.

A cover plate or wall panel 22 is subsequently placed over each side of the enclosure 10 to completely cover the same. When it is placed in position over its respective side of the enclosure, it completely covers all of the frame bordering its respective side, except for the peripheral edge bead. It covers and obscures the endless gasket 32 seated in the endless seat of the frame and engages the same fully about its endless extent to compress it tightly into its seat in the frame and into greater cooperable engagement with the sloping retainer surfaces of such seat. At the same time, the inner face of the cover plate 22 fully engages and rests against the endless seating surface defined by the coextensive surfaces 20 and 38 of the corner brackets 14 and runners 16 respectively. It is further supported on the additional surfaces 40. These surfaces support the cover plates when the same are unusually large and, therefore, limit their flexing and bending.

When so positioned in the recessed seat, the cover plate 22 is substantially flush with and is in the same plane as the peripheral beads 18 and 36 formed on the corner brackets and runners respectively. The cover plates or wall panels 22 are retained in the endless seat of the frame bordering each side of the shield 10 by the application of any convenient securing means such as the screws 52 or any other convenient connecting means. The securing means 52 are adapted to extend through the cover plate or wall panels 22 from the outside thereof through the radio frequency interference suppressing gasket 32 for engagement with the edge runner 16 and the ledge 34 of the corner bracket 14 as at securing points 49. Thus, when the cover plate 22 is secured in position, it completely covers its respective side wall of the multi-sided enclosure 10. At the same time, it is compressed into intimate and full electrical conductive engagement with the gasket 32 that is completely sandwiched to form an electrically conductive path between the cover plate and the frame bordering the respective side of the enclosure 10.

Because the cover plate is recessed in and is substantially flush with the peripheral bead of each frame side, it forms a smoothly, almost unbroken continuation thereof. This arrangement of construction provides a complete shielded wall panel enclosure that prevents the passage of radio frequency interference or energy from between the interior and exterior of the enclosure 10. The provision of the endless gasket sandwiched in engagement between the cover plate and the frame portion in which the gasket is retained provides a complete and effective barrier and seal against the passage of radio frequency interfering energy from between within and without the enclosure.

The novel details of construction of the brackets 14 and runners 16 that form the details of the framework 12 also permit the construction of any size and shape shielded enclosure 10. In the illustration of FIG. 1, it will be seen that although the cover plates 22 form uninterrupted wall panels for each of the longitudinally extending sides of the enclosure 10, such longitudinal sides may be supported intermediate the top and bottom by intermediate extension brackets generally identified by the numeral 54 and extension arms generally identified by the numeral 56.

The extension brackets 54 and arms 56, as seen more clearly in FIG. 8, provide the intermediate transverse connections and supports that form a part of each frame bordering each of the sides of the enclosure 10 and defining a part of the whole framework 12. The extension brackets 54 and arms 56 are utilized in large enclosures or where it is desired to enlarge, increase the size or vary the shape of existing enclosures. In accordance with the concept of the present invention, the extension brackets 54 are engaged in and form an integral part of the frame bordering each of the sides of the enclosure 10 and, therefore, become an integral part of the framework 12. They are joined with the corner brackets in a continuous bordering frame construction by the peripheral runners 16.

To facilitate this arrangement, the extension bracket 54 is a substantial duplication of the corner bracket 14 in that it includes a peripheral bead 58 that coincides with and is adapted to be related in alignment with the beads 18 and 36 of the corner brackets and runners 14 and 16 respectively to form a continuation thereof. The extension brackets 54 effectively divide the height of the shielded enclosure 10 into upper and lower parts. For this reason, the bracket 54 is provided with a corner surface 60 that is recessed inward or interior from the surface of the bead 58 to define a continuation of the seat for the cover plate 22.

On each of the opposite sides of the T-shaped surface 60 are gasket seats 62. The gasket seats 62 include angularly disposed surfaces or retainer means 64. Like the corner brackets 14, the extension brackets 54 have ledges 66 that provide supporting surfaces against which the runners 16 may rest and with which they may be conductively connected. Thus, the extension brackets 54 serve to form intermediate connecting and support portions for the runners 16. The recessed surface 60 provides a seat against which the cover plate 22 may rest and be secured for continuous conductive engagement with the frame of each side of the enclosure. The upper and lower corner gasket seats 62 define continuations of the upper and lower endless gasket seats defined in the runners 16 and the corner brackets 14.

The gasket seats and cover plate seats of the extension brackets 54 are continued on and along the intermediate extension arms 56 that are transversely directed and serve as supports and braces intermediate the lengthwise directed edges of each frame bordering the sides of the enclosure 10. Thus, the extension runners 56 are provided with mating recessed gasket seats 68 on opposite upper and lower sides of a cover plate surface or seat 70. A stiffener leg 72 extends rearward or toward the interior of the enclosure from the back thereof to coincide with a stiffener web 74 provided on the extension bracket 54. The extension arms 56 are adapted to rest against the transversely directed ledges 66 of the extension brackets 54 in the same mating relationship as do the runners 16.

In this way, the gasket seats 68 align and coincide with the corner gasket seats 62 in the extension brackets 54 to define a continuation of the upper and lower endless gasket seats for the reception of a gasket member 32 in each upper and lower part of the side of the enclosure 10. Thus, each time an extension bracket 54 and extension arm 56 is utilized in the shielded enclosure, the respective side of the enclosure is effectively divided into a plurality of parts each of which has its own bordering frame that includes a bordering radio frequency interference suppressing gasket. The whole side of the enclosure, however, is adapted to be covered and completely shielded against the passage of stray radio frequency energy by the cover plate 22 that fits flush into its seat provided by the seating surfaces on all of the elements completing the details of construction of the frame side.

Once again, the extension arms 56 may be secured in conductive engagement with the brackets 54 at the connecting points 48 by any convenient means, as the rivets 50. When the cover plate 22 is positioned over the side of the enclosure, it covers the brackets 54 and extension arm 56 resting in seating and conductive engagement with their respective surfaces 60 and 70. Thereafter, the cover plate 22 may be secured directly to the brackets 54, the arm 56 and the gaskets 32 in the upper and lower parts of the side by the application of suitable securing means 52 to securing points 49.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. In a radio frequency interference shielded enclosure having a plurality of sides,
- an electrically conductive frame defining the peripheral edges of one of said sides and having one portion thereof extending inward from about the peripheral edge,
- a continuous channel in said one portion spaced inward from said peripheral edge,
- said channel being defined by a planar wall and spaced surfaces projecting forwardly therefrom defining undercut surfaces,
- a continuous radio frequency interference suppressing gasket seated in said channel and extending completely about said one portion and spaced inward from the peripheral edge of said frame,
- said gasket having a thickness slightly in excess of the spacing between said planar wall and said undercut surfaces,
- the edges of said gasket being received between said undercut surfaces and said planar wall so that said gasket is forced into electrical contact with said planar wall,
- a peripheral seat in said one portion spaced inward from said peripheral edge and outward of said channel,
- an electrically conductive cover plate covering said one portion and conductively engaging said gasket and closing said one side of said enclosure,
- said cover plate having its peripheral edge seated in and conductively engaging said seat about the periphery hereof,
- and means connecting said cover plate with said frame.

2. In a radio frequency interference shielded enclosure having a plurality of sides,
- each side having a covering wall of electrically conductive material,
- a frame of electrically conductive material bordering each of said sides,
- a seat bordering each of said frames and against which a respective one of said covering side walls seats and is engaged,
- means connecting each of said frames and said walls together in electrical conductive relationship throughout the seat border,
- and an endless radio frequency interference suppressing gasket bordering each of said sides and engaged between each of said frames and covering side walls in electrical conductive relationship therewith to prevent the passage of radio frequency energy therebetween, a channel recessed in each of said frames bordering each of said seats,
- said channels each having at least a surface directed angularly inward from its respective one of said seats and engaged with a respective one of said gaskets positioning and retaining the same in its respective channel and in engagement between and with its respective frame and covering wall.

3. In a radio frequency interference shielded enclosure as in claim 2, in which
- each of said frames includes an uninterrupted bracket at each corner and runners connected with and between said brackets,
- said channel and said seat being defined in said brackets and runners,
- said brackets each having a ledge,
- and said runners each resting on and being connected with each of said brackets at the respective ledges thereof.

4. In a radio frequency interference shielded enclosure as in claim 3,
- and extension brackets connected with said runners between said corner brackets,
- each of said extension brackets having a channel and a seat defined therein.

References Cited

UNITED STATES PATENTS

| | | | |
|---|---|---|---|
| 2,737,266 | 3/1956 | Gross | 220—81 X |
| 3,178,246 | 4/1965 | Riles | 312—257 |
| 3,229,050 | 1/1966 | Pearson | 220—81 X |
| 3,240,862 | 3/1966 | Merkl et al. | 174—35 |

OTHER REFERENCES

Electrical Manufacturing "Radio Interference," pub. in Electrical Manufacturing, September 1954, vol. 54, No. 3, page 119.

"Widney-Dorlec Cabinet Components" published by British Industries Corp., 164 Duane St., New York, N.Y., Mar. 28, 1955.

Metex "Supressing Radio Interference With Metex Shielding Products," pub. by Metal Textile Corp., Electronic Div., Rosell, N.J., pages 11–13.

DARRELL L. CLAY, *Primary Examiner.*

LEWIS H. MYERS, *Examiner.*